United States Patent
Rohrer Boutwell et al.

(10) Patent No.: US 7,476,453 B2
(45) Date of Patent: Jan. 13, 2009

(54) LOW THERMAL CONDUCTIVITY THERMAL BARRIER COATING SYSTEM AND METHOD THEREFOR

(75) Inventors: Brett Allen Rohrer Boutwell, Liberty Township, OH (US); Ramgopal Darolia, West Chester, OH (US); Curtis Alan Johnson, Niskayuna, NY (US); Irene Spitsberg, Loveland, OH (US); Mark Daniel Gorman, West Chester, OH (US); Yan Gao, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 11/006,367

(22) Filed: Dec. 6, 2004

(65) Prior Publication Data

US 2006/0121294 A1    Jun. 8, 2006

(51) Int. Cl.
  B32B 18/00    (2006.01)
  B32B 15/04    (2006.01)
(52) U.S. Cl. .................. 428/702; 428/701; 428/469; 416/241 B; 416/241 R
(58) Field of Classification Search ............ 416/241 B, 416/241 R; 428/702, 469, 701
See application file for complete search history.

(56) References Cited

U.S. PATENT DOCUMENTS

| | | | |
|---|---|---|---|
| 3,935,159 A * | 1/1976 | Demillecamps et al. ...... 524/431 |
| 4,535,033 A | 8/1985 | Stecura ..................... 428/633 |
| 5,683,761 A | 11/1997 | Bruce et al. ................ 427/596 |
| 5,780,110 A * | 7/1998 | Schaeffer et al. .......... 427/327 |
| 5,792,521 A | 8/1998 | Wortman .................. 427/567 |
| 5,871,820 A | 2/1999 | Hasz et al. ............... 427/419.2 |
| 5,914,189 A | 6/1999 | Hasz et al. ............... 427/419.2 |
| 5,985,470 A | 11/1999 | Spitsberg et al. ........... 428/689 |
| 6,025,078 A | 2/2000 | Rickerby et al. ........... 428/469 |
| 6,117,560 A | 9/2000 | Maloney .................. 428/472 |
| 6,177,200 B1 | 1/2001 | Maloney .................. 428/472 |
| 6,284,323 B1 | 9/2001 | Maloney ................ 427/419.2 |
| 6,319,614 B1 | 11/2001 | Beele ..................... 428/469 |
| 6,410,148 B1 | 6/2002 | Eaton, Jr. et al. ........... 428/446 |
| 6,444,335 B1 | 9/2002 | Wang et al. ............... 428/701 |
| 6,620,465 B2 | 9/2003 | Rigney et al. ............. 427/567 |
| 6,620,525 B1 | 9/2003 | Rigney et al. ............. 428/633 |
| 6,730,422 B2 | 5/2004 | Litton et al. .............. 428/701 |

(Continued)

OTHER PUBLICATIONS

"Alumina AI203 (110): An ab-initio Examination the Surface Electronic Structure"; Michael Vargas and Dr. Nick Kioussis Obtained at http://web.archive.org/web/20051217070829/http://www.csun.edu/~mmv71887/Aluminareport1.doc with a date of Dec. 17, 2005.*

(Continued)

Primary Examiner—John J. Zimmerman
Assistant Examiner—Aaron Austin
(74) Attorney, Agent, or Firm—Harrington & Smith, PC

(57) ABSTRACT

In accordance with an embodiment of the invention, a thermal barrier coating for inclusion in a thermal barrier coating system is provided. The thermal barrier coating comprises a compound having a rhombohedral phase. In accordance with another embodiment of the invention, a thermal barrier coating is provided that comprises a compound having the formula of: $A_4B_3O_{12}$, wherein A is at least one rare earth element; and B is selected from the group consisting of Zr, Hf and mixtures thereof.

21 Claims, 4 Drawing Sheets

U.S. PATENT DOCUMENTS

| | | | | |
|---|---|---|---|---|
| 6,730,918 | B2 | 5/2004 | Srivastava et al. | 250/458.1 |
| 6,733,908 | B1 | 5/2004 | Lee et al. | 428/702 |
| 6,759,151 | B1 | 7/2004 | Lee | 428/701 |
| 6,858,334 | B1 | 2/2005 | Gorman et al. | 428/701 |
| 6,875,529 | B1 | 4/2005 | Spitsberg et al. | 428/701 |
| 6,982,126 | B2 * | 1/2006 | Darolia et al. | 428/701 |
| 7,115,326 | B2 | 10/2006 | Spitsberg et al. | 428/697 |
| 7,115,327 | B2 | 10/2006 | Spitsberg et al. | 428/697 |
| 7,166,373 | B2 | 1/2007 | Spitsberg et al. | 428/702 |
| 7,226,672 | B2 | 6/2007 | Litton et al. | 428/701 |
| 2002/0028344 | A1 | 3/2002 | Beele | 428/632 |
| 2002/0098391 | A1 | 7/2002 | Tanaka et al. | 428/697 |
| 2002/0172837 | A1 * | 11/2002 | Allen et al. | 428/632 |
| 2003/0108768 | A1 | 6/2003 | Subramanian | 428/689 |
| 2004/0043244 | A1 | 3/2004 | Bruce et al. | 428/632 |
| 2004/0175597 | A1 | 9/2004 | Litton et al. | 428/702 |
| 2005/0142392 | A1 | 6/2005 | Spitsberg et al. | 428/701 |
| 2005/0142394 | A1 | 6/2005 | Spitsberg et al. | 428/701 |
| 2005/0142395 | A1 | 6/2005 | Spitsberg et al. | 428/701 |
| 2005/0255648 | A1 | 11/2005 | Bhatia et al. | 428/632 |
| 2006/0115659 | A1 | 6/2006 | Hazel et al. | 428/450 |
| 2006/0121293 | A1 | 6/2006 | Boutwell et al. | 428/469 |
| 2006/0121295 | A1 | 6/2006 | Boutwell et al. | 428/469 |
| 2006/0166016 | A1 | 7/2006 | Spitsberg et al. | 428/471 |
| 2006/0166018 | A1 | 7/2006 | Spitsberg et al. | 428/471 |

OTHER PUBLICATIONS

"New $ZrO_2$—$Yb_2O_3$ plasma-sprayed coatings for thermal barrier applications" by Stephan Stecura; Thin Solid Films; vol. 150 Iss 1 pp. 15-40; Jun. 22, 1987.*

Wu, J. et al., "Low-Thermal-Conductivity Rare-Earth Zirconates for Potential Thermal-Barrier-Coating Applications", Dec. 2002, pp. 3031-3035, Journal of the American Ceramic Society, vol. 85, No. 12.

Hill, M.D. et al., "Creating an Effective Barrier", Internet Article Posted Sep. 04, 2003, pp. 1-5, http://www.ceramicindustry.com/CDA/ArticleInformation/coverstory/BNPCoverstoryIte . . . .

"Next Generation Thermal Barrier Coatings Using DVD", pp. 1-8, Internet Article http://www.ipm.virginia.edu/newresearch/tbc/home.php, Intelligent Processing of Materials LA, Research at IPM Laboratories.

Bruce, Robert W., "Development of 1232° C (2250° F) Erosion and Impact Tests for Thermal Barrier Coatings © ", 12 pgs., Tribology Transactions, vol. 41 (1998).

Ueno, S. et al., "Development of Oxide-Based EBC for Silicon Nitride", Oct. 2004, pp. 362-373, International Journal of Applied Ceramic Technology, vol. 1, No. 4.

Stecura Stephan: "New $ZrO_2$-$YbO_3$ Plasma-Sprayed Coatings for Thermal Barrier Applications" Thin Solid Films Jun. 22, 1987, vol. 150, No. 1, pp. 15-40.

Zhu D et al: "Thermal conductivity and stability . . . " NASA/TM-2003-212544, Nov. 2003, pp. 1-10.

Levi Carlos, "Emerging Materials and Processes for Thermal Barrier Systems", pp. 1-34, Mar. 2004.

Vargas et al.,"Alumina Al2O3 (110): An ab-initio Examination of the Surface Electronic Structure" Dec. 17, 2005.

U.S. Appl. No. 11/170,469, filed Jun. 28, 2005.

Yirong He et al., Development of Refractory Silicate-YSZ Dual Layer TBCs, NASA/TM-1999-209079, Jul. 1999, retrieved from the Internet: URL:http://gltrs.grc.nasa.gov/reports/19999/TM-1999-209079.pdf, 19 pgs.

Ueno Shunkichi et al., "Development of oxide-based EBC for silicon nitride", Int. J. Appl. Cerma, Technol. 2004, vol. 1, No. 4, Oct. 2004 (2204-10), pp. 362-373.

* cited by examiner

LOW THERMAL CONDUCTIVITY THERMAL BARRIER COATING SYSTEM AND METHOD THEREFOR

GOVERNMENT RIGHTS

The invention was made in part under contract number N00421-00-3-0443 awarded by the Government (Navy). Accordingly, the Government has certain rights in this invention.

CROSS-REFERENCE TO RELATED APPLICATION

The subject application shares certain attributes with U.S. Ser. No. 11/006,368, entitled, "Sintering Resistant, Low Conductivity, High Stability Thermal Barrier Coating/Environmental Barrier Coating System For A Ceramic-Matrix Composite(CMC) Article To Improve High Temperature Capability" and with U.S. Ser. No. 11/006,292, entitled, "Thermal Barrier Coating/Environmental Barrier Coating System For A Ceramic-Matrix Composite (CMC) Article To Improve High Temperature Capability", each of which are filed concurrently herewith.

FIELD OF THE INVENTION

This invention relates to coating systems suitable for protecting components exposed to high temperature environments, such as the hot gas flow path through a gas turbine engine. More particularly, the invention relates to a thermal barrier coating (TBC) for inclusion in a TBC system, which is characterized by multiple beneficial properties including a low thermal conductivity, strong resistance to hostile environmental effects (erosion and impact) and good phase stability.

BACKGROUND OF THE INVENTION

Higher operating temperatures for gas turbine engines are continuously sought in order to increase efficiency. However, as operating temperatures increase, the high temperature durability of the components within the engine must correspondingly increase. For this reason, the use of TBCs on components, such as combustors, high pressure turbine (HPT) blades and vanes, has increased in commercial and military gas turbine engines. The thermal insulation of a TBC enables such components to survive higher operating temperatures, increases component durability, and improves engine reliability. A TBC is typically a ceramic material deposited on an environmentally-protective bond coat overlying a metallic substrate to form what is often termed a TBC system. Bond coat materials widely used in TBC systems include oxidation-resistant overlay coatings, such as MCrAlX (where M is iron, cobalt and/or nickel, and X is yttrium or other element), and oxidation-resistant diffusion coatings, such as diffusion aluminides that contain aluminum intermetallics.

Ceramic materials, particularly binary yttria-stabilized zirconia (YSZ) ceramics, are often used as TBC materials because of their high temperature capability, low thermal conductivity, and relative ease of deposition by air plasma spraying (APS), flame spraying and physical vapor deposition (PVD) techniques. TBCs formed by these methods have a lower thermal conductivity than a dense ceramic of the same composition as a result of the presence of microstructural features or defects and pores in the TBC microstructure. TBCs employed in the highest temperature regions of gas turbine engines are often deposited by electron beam physical vapor deposition (EBPVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma deposition, and other similar melting and evaporation deposition processes.

In order for a TBC to remain effective throughout the planned life cycle of the component it protects, it is important that the TBC has and maintains a low thermal conductivity throughout the life of the component, including high temperature excursions. However, the thermal conductivities of TBC materials, such as YSZ, are known to increase over time when subjected to the operating environment of a gas turbine engine. As a result, TBCs for gas turbine engine components are often deposited to a greater thickness than would otherwise be desirable. Multiple layers are thus often added to some YSZ TBCs to correct deficiencies resulting in unwanted increased thickness of the coating system. Alternatively, internally cooled components, such as blades and nozzles, must be designed to have higher cooling flow. However, the above solutions may be undesirable for reasons relating to cost, weight, component life and engine efficiency.

As illustrated above, a thermal barrier coating, such as YSZ, while being known for providing certain environmental protection benefits to a coating system may not provide other important properties needed for an adequate coating. Often, prior thermal barrier coatings provide specific protection or benefits in one particular area, but fail to provide benefits in other important areas required by thermal barrier coating systems.

In view of the above, it can be appreciated that further improvements in TBC technology are desirable, particularly as TBCs are employed to thermally insulate components intended for more demanding engine designs. A TBC having multiple beneficial effects, such as a low thermal conductivity, strong resistance to erosion and impact, sufficiently long life and phase stability would allow for higher component surface temperatures and reduced coating thickness for the same surface temperature. Reduced TBC thickness, especially in applications like combustors often employing relatively thick TBCs, would result in a significant cost reduction and weight benefit.

BRIEF DESCRIPTION OF THE INVENTION

In accordance with an embodiment of the invention, a thermal barrier coating for inclusion in a thermal barrier coating system is provided. The thermal barrier coating comprises a compound having a rhombohedral phase.

In accordance with another embodiment of the invention, a thermal barrier coating for inclusion in a thermal barrier coating system is provided. The thermal barrier coating comprises a compound having the formula of: $A_4B_3O_{12}$, wherein A is at least one rare earth element; and B is selected from the group consisting of Zr, Hf and mixtures thereof.

In accordance with another embodiment of the invention, a thermal barrier coating system is provided. The thermal barrier coating system comprises a bond coat that overlies a surface of a substrate. In addition, the barrier coating system comprises a thermal barrier coating bonded to the bond coat. The thermal barrier coating comprises a compound having a rhombohedral phase.

In accordance with another embodiment of the invention, a thermal barrier coating system is provided. The thermal barrier coating system comprises a bond coat that overlies a surface of a substrate. In addition, the thermal barrier coating system comprises a thermal barrier coating bonded to the bond coat. The thermal barrier coating comprises a compound having the formula of: $A_4B_3O_{12}$ wherein A is at least one rare earth element selected from the group consisting of Yb, Ho, Er, Tm and Lu; B is selected from the group consisting of Zr, Hf and mixtures thereof.

In accordance with a further embodiment of the invention, a thermal barrier coating for inclusion in a thermal barrier coating system is provided. The thermal barrier coating comprises: $Yb_4Zr_3O_{12}$. $Yb_2O_3$ is included in an amount from about 35% by weight to about 75% by weight to form the thermal barrier coating.

In accordance with another embodiment of the invention, a thermal barrier coating for inclusion in a thermal barrier coating system is provided. The thermal barrier coating comprises: $Yb_4Hf_3O_{12}$. $Yb_2O_3$ is included in an amount from about 35% by weight to about 75% by weight to form the thermal barrier coating.

In accordance with another embodiment of the invention, a method for producing a thermal barrier coating on a metallic substrate is provided. The method comprises applying over the metallic substrate a thermal barrier coating comprising a compound having a rhombohedral phase.

In accordance with yet another embodiment of the invention, a method for producing a thermal barrier coating on a metallic substrate is provided. The method comprises applying over the metallic substrate a thermal barrier coating comprising a compound having the formula of: $A_4B_3O_{12}$, wherein A is at least one rare earth element; B is selected from the group consisting of Zr, Hf, and mixtures thereof.

Advantageously, embodiments of the invention provide a thermal barrier coating having a rhombohedral phase (described in more detail below) and multiple beneficial effects. The beneficial effects of the TBC include low thermal conductivity, strong resistance to erosion, strong resistance to impact, sufficiently long life of the TBC and good phase stability. The advantage of having a TBC with such multiple benefits, rather than just one specific benefit, is that it allows one to avoid having to add additional layers, which would result in an increased thickness of the coating system. As mentioned, increased thickness of the TBC system often translates into problems relating to cost, component life and engine efficiency.

Other features and advantages will be apparent from the following more detailed description, taken in conjunction with the accompanying drawings, which illustrate by way of example the principles of the invention.

DETAILED DESCRIPTION OF THE INVENTION

Embodiments of the invention are generally applicable to components subjected to high temperatures and particularly to components, such as the high and low pressure turbine nozzles and blades, shrouds, combustor liners and augmentor hardware of gas turbine engines. While the advantages are particularly suitable for high pressure turbine blades and the other afore-mentioned components, the teachings described herein are generally applicable to any component on which a thermal barrier coating may be used to protect the component from a high temperature environment.

Figure 1:
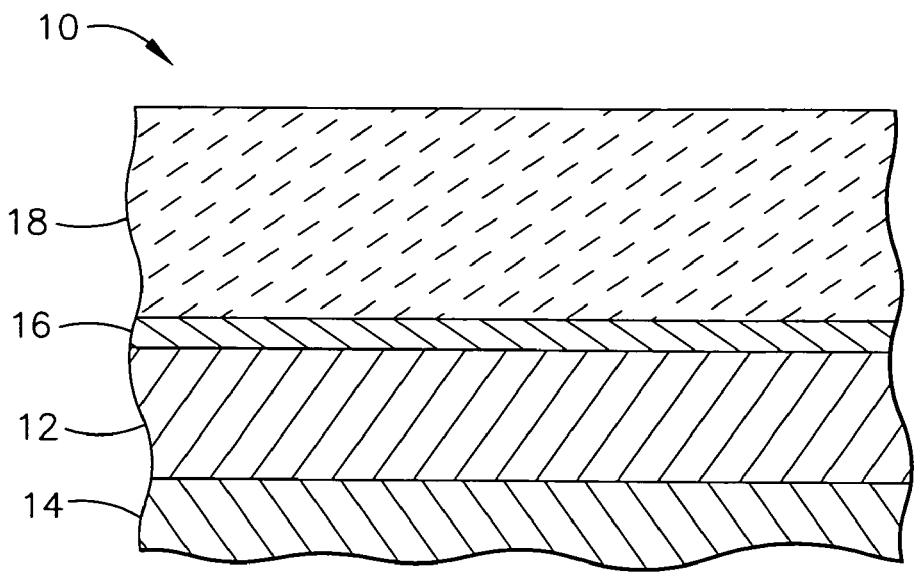
FIG. 1 illustrates a cross-sectional view of a TBC coating system, in accordance with an embodiment of the invention.
Figure 2:
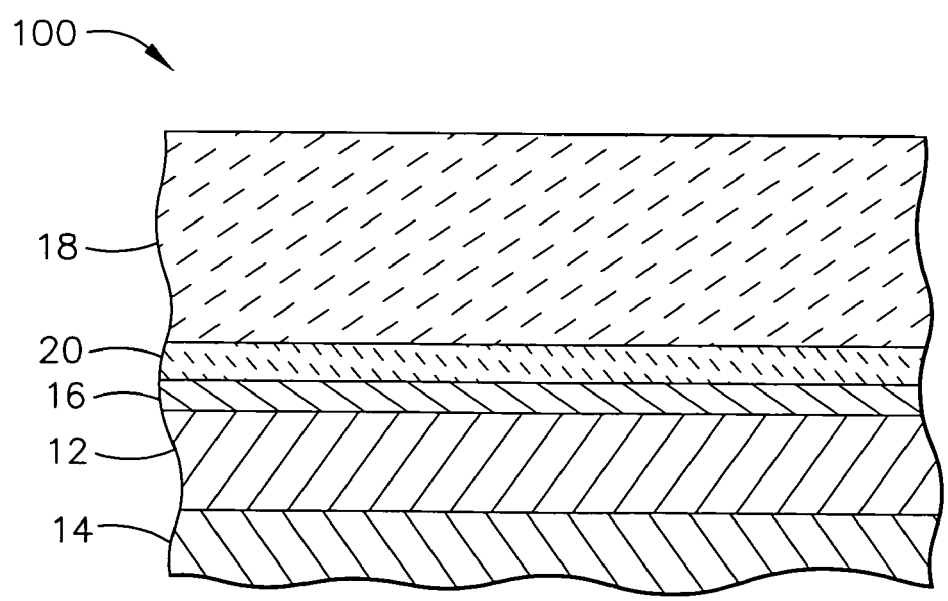
FIG. 2 illustrates a cross-sectional view of a TBC coating system, in accordance with another embodiment of the invention.

Referring to FIG. 1, a TBC system 10 of a first embodiment is shown. The TBC system 10 includes a metallic bond coat 12 that overlies the surface of a substrate 14, the latter of which is typically a superalloy and the base material of a component, such as a turbine blade. The bond coat 12 may be any suitable bond coat(s) including, but not limited to diffusion coatings, such as a diffusion aluminide or diffusion platinum aluminide known in the art, NiAlCrZr or NiAl coatings, MCrAlX overlay coatings (where M is Ni, Fe, Co or mixtures thereof and X is yttrium or another element). Preferably, bond coat 12 comprises an aluminum-rich composition. Aluminum-rich coatings are known to develop an aluminum oxide (alumina) scale, shown at 16 in FIGS. 1-2, which is grown by oxidation of the bond coat 12.

The alumina scale 16 may chemically bond a TBC 18 to the bond coat 12 and substrate 14. The TBC 18 is intended to be deposited to a thickness that is sufficient to provide the required thermal protection for the underlying substrate 14, generally on the order of about 3 mils (76.2 microns) to about 100 mils (2540 microns).

Additionally, the TBC system 10 may comprise additional layers. For instance, the TBC 18 can be used as an underlayer and/or overlayer of another ceramic composition. By way of example in another embodiment depicted in FIG. 2, a TBC system 100 is provided, which includes the bond coat 12, aluminum oxide layer 16 and TBC 18. In addition, an underlayer 20 of 7% YSZ is located between the oxide layer 16 and the TBC 18, in order to prolong the life of the TBC, e.g. improved spallation or longer life of the upper layer (TBC 18). The underlayer typically has a thickness of about 0.5 to 3 mils (25.4-76.2 microns), preferably about 1 mil (25.4 microns).

Although the above description refers to using the TBC 18 in conjunction with metallic substrates, it is noted that the TBC 18 may also be used with other types of substrates typically employed in the gas turbine engine art such as silicon based substrates, particularly those with silicon carbide (SiC) as a matrix material or a reinforcing material. In addition, any type of environmental barrier coating known in the art for use with metallic substrates or silicon based substrates of gas turbine components may also be used in conjunction with the TBC 18.

In a preferred embodiment, the TBC 18 comprises $Yb_4Zr_3O_{12}$ having a rhombohedral phase. In particularly preferred embodiments, the TBC 18 comprises $Yb_4Zr_3O_{12}$ having a rhombodhedral crystalline structure with a hexagonal setting. It is noted that the rhombodhedral crystalline structure with a hexagonal setting embodiment is a narrower embodiment encompassed within the rhombodhedral phase embodiment. It is also noted that the phrase a rhombohedral crystalline structure with a hexagonal setting is used interchangeably throughout this application to mean a structure with a space group of R-3 and space group number of 148 described in the International Tables for Crystallography. Further, the rhombohedral phase embodiment and the rhombohedral crystalline structure with a hexagonal setting embodiment each function to provide the beneficial properties mentioned herein.

In further embodiments of the invention, other rare earth oxides besides $Yb_2O_3$ (Ytterbium Oxide), including but not limited to the rare earth oxides $Ho_2O_3$ (Holmium Oxide), $Er_2O_3$ (Erbium Oxide), $Tm_2O_3$ (Thulium Oxide) and $Lu_2O_3$ (Lutetium Oxide) may be alloyed to zirconia to form a TBC (of either $Ho_4Zr_3O_{12}$, $Er_4Zr_3O_{12}$, $Tm_4Zr_3O_{12}$, $Lu_4Zr_3O_{12}$, respectively) having the same rhombohedral zirconate phase or R-3 space group/Group #148 structure as the $Yb_4Zr_3O_{12}$. with the same beneficial properties as well. In other embodiments, instead of zirconia, rare earth oxides including but not limited to the rare earth oxides $Yb_2O_3$, $Ho_2O_3$, $Er_2O_3$, $Tm_2O_3$ and $Lu_2O_3$ and mixtures thereof are alloyed to hafnia oxide ($HfO_2$) and mixtures of $ZrO_2$ and $HfO_2$ to form a TBC 18 (of either $Yb_4Hf_3O_{12}$, $Ho_4Hf_3O_{12}$, $Er_4Hf_3O_{12}$, $Tm_4Hf_3O_{12}$, $Lu_4Hf_3O_{12}$, respectively) having a rhombohedral hafnia phase or R-3 Space Group/Group #148 structure, wherein this TBC 18 exhibits the beneficial properties as the rhombohedral zirconate phase described above.

Moreover, in other embodiments, additional rare earth oxides, including but not limited to lanthana ($La_2O_3$), yttria ($Y_2O_3$), ceria ($CeO_2$), neodymia ($Nd_2O_3$), gadolinium oxide ($Gd_2O_3$) and dysprosia ($Dy_2O_3$) and any mixtures thereof may be alloyed to the TBC 18 of the invention to further modify (e.g. lower the thermal conductivity). These additional rare earth oxides do not change the rhombohedral phase or rhombohedral crystalline structure with hexagonal setting of the TBC 18, but rather are only added to modify the properties of the TBC 18. For example in one embodiment, any of one of $La_2O_3$, $Y_2O_3$, $CeO_2$, $Nd_2O_3$, $Gd_2O_3$, $Dy_2O_3$ or any mixtures thereof could be alloyed with $Yb_4Zr_3O_{12}$. TBC 18 to further lower the thermal conductivity of the TBC 18.

Now referring back to a preferred embodiment, the $Yb_2O_3$ portion of the TBC 18 is preferably present in high concentrations. The term "high concentration" is used herein with reference to $Yb_2O_3$ (or other rare earth oxide) at a concentration of at least about 35% by weight and upwards of e.g. $Yb_2O_3$ (based upon the combined weight of the resulting compound), prior to being combined with $ZrO_2$ to form the $Yb_4Zr_3O_{12}$ TBC 18 compound. It is desirable that the $Yb_2O_3$ portion be in the range of about 35% to about 75% by weight because it has been observed experimentally that these amounts provide beneficial properties in the form of a TBC 18 with a low thermal conductivity, strong impact and erosion capacity, as well as phase stability. It is further noted that it has also been experimentally determined that when at least about 35% by weight of $Yb_2O_3$ is combined with $ZrO_2$, the resulting, $Yb_4Zr_3O_{12}$ TBC 18 compound has a rhombohedral phase, e.g. the TBC 18 compound has a rhombohedral crystalline structure with a hexagonal setting. The rhombohedral phase is believed to possibly be responsible for some, if not all, of the many beneficial properties of the TBC 18, as described in further detail below.

Referring now to Table 1 below, thermal conductivities of various TBC compositions are summarized therein. Initially, before determining the thermal conductivity of TBC 18 in accordance with an embodiment of the invention ($Yb_4Zr_3O_{12}$ having a rhombohedral crystalline structure with a hexagonal setting) and comparison TBCs (i.e. pyrochlore $Nd_2O_3$—$ZrO_2$ and industry standard 7% YSZ) and as noted in Table 1, a thermal aging treatment was conducted on the specimens at about 1200° C. for two hours. After the thermal aging treatment, the thermal conductivities were then determined for the TBCs at a temperature of about 890° C. using a Laser Flash measurement known in the art.

TABLE I

| TBC Chemistry | Crystal Structure | Aged Thermal Conductivity (W/m*K) |
|---|---|---|
| 7% YSZ | Tetragonal | 1.6 |
| $ZrO_2$-65 wt. % $Nd_2O_3$ | Pyrochlore | 0.9-1.0 |
| $ZrO_2$-45 wt. % $Yb_2O_3$ | Rhombohedral structure with hexagonal setting | 0.83-1.2 |

The above results show that the TBC coatings including $Yb_4Zr_3O_{12}$ having a rhombohedral crystalline structure with a hexagonal setting in the amounts evaluated had significantly lower thermal conductivities than the industry standard 7% YSZ material.

The $Yb_4Zr_3O_{12}$ TBC 18 having the rhombohedral crystalline structure with hexagonal setting also out performed the pyrochlore $Nd_2O_3$—$ZrO_2$ in erosion and impact studies. As mentioned, it is preferable to have a TBC with not only a low thermal conductivity, but also other important beneficial properties, including good resistance to hostile environmental effects, such as those encountered during impact and erosion testing. These test results for erosion and impact are also set forth below.

Figure 3:
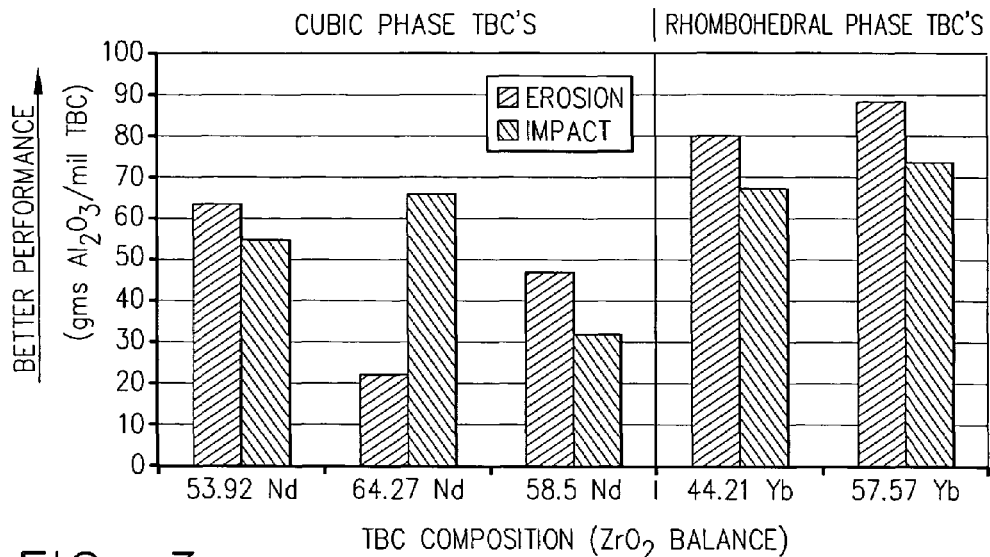
FIG. 3 illustrates erosion and impact performance results for $Nd_2O_3$—$ZrO_2$ TBCs versus $Yb_4Zr_3O_{12}$ TBCs.

Specifically, FIG. 3 illustrates the results of impact and erosion tests that were conducted on pin specimens of pyrochlore $Nd_2O_3$—$ZrO_2$ and rhombohedral crystalline structure/ hexagonal setting $Yb_4Zr_3O_{12}$ TBCs at high temperatures (about 1221° C.) and high gas velocities while subjected to an alumina powder injected into the gas stream. An alumina powder with an average particle size of about 50 micrometers was used to evaluate erosion resistance, while an alumina powder with an average particle size of about 560 micrometers was used to evaluate impact resistance. The specimens were rotated at a rate of about 500 rpm while subjected to the high velocity powder. Both erosion and impact resistance were measured in terms of the number of grams of $Al_2O_3$ required to remove about 1 mil of $Al_2O_3$ of the TBC 18. These results are summarized below.

From the results of the impact and erosion tests illustrated in FIG. 3, it can be seen that the TBC 18 comprising $Yb_4Zr_3O_{12}$ having a rhombohedral crystalline structure with a hexagonal setting in accordance with embodiments of the invention exhibited better resistance to erosion and also better impact resistance than that of pyrochlore $Nd_2O_3$—$ZrO_2$.

Figure 4:
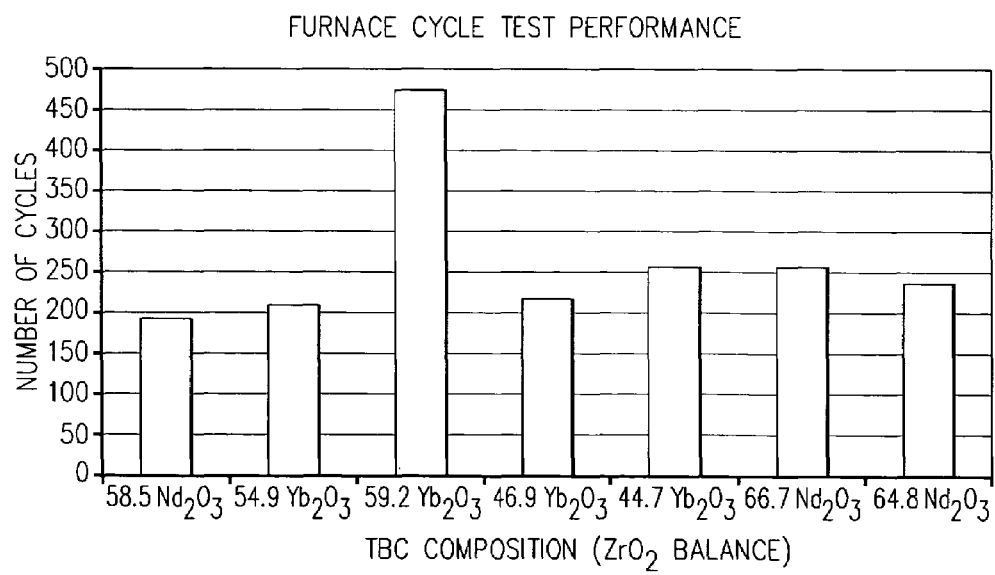
FIG. 4 illustrates Furnace Cycle Test performance for $Nd_2O_3$—$ZrO_2$ TBCs versus $Yb_4Zr_3O_{12}$ TBCs.

FIG. 4 illustrates furnace cycle tests (FCT) for $Yb_4Zr_3O_{12}$ TBC 18 in comparison to $Nd_2O_3$—$ZrO_2$. In the tests, each $Yb_4Zr_3O_{12}$ and $Nd_2O_3$—$ZrO_2$ had about a 1 mil 7YSZ layer under their respective TBCs. The purpose of these tests was to see how well the TBC 18 adheres to the bond coat 12. As is known in the art, a FCT measures how many cycles it takes until a TBC fails (e.g. spallation). The FCT tests were performed on button specimens using one-hour cycles. A one hour cycle in this test was represented by subjecting the TBC specimen to temperatures of approximately 1163° C. and then the cooling the temperature of the specimen down to approximately 200° C. and then raising the temperature back up to approximately 1163° C.

The tests reported above demonstrate that the $Yb_4Zr_3O_{12}$ TBC 18, exhibited resistance to spallation at least as good as $Nd_2O_3$—$ZrO_2$. It is further noted that the rhombohedral $Yb_4Zr_3O_{12}$ TBC 18, also exhibited resistance to spallation that was at least as good as that of the industry standard 7% YSZ, which has a baseline or average FCT life of about 230 cycles before spallation occurs.

After determining that $Yb_4Zr_3O_{12}$ has a rhombohedral crystalline structure with a hexagonal setting when, for example, the range amounts of $Yb_2O_3$ from about 35% to about 75% by weight $Yb_2O_3$ were used in forming the $Yb_4Zr_3O_{12}$ compound, it was then desired to know if this rhombohedral crystalline structure would have phase stability under the rigorous conditions of, for instance, when the TBC was applied to components of a gas turbine engine.

In this regard, in order to test the phase stability of the rhombohedral structure of the $Yb_4Zr_3O_{12}$ compound, an FCT was run on two samples of the $Yb_4Zr_3O_{12}$ compound, each compound having a rhombohedral crystalline structure with a hexagonal setting. By way of example, a first FCT test ("first run") was conducted with about 44.9 wt. % $Yb_2O_3$ and about 2.31 wt. % $Y_2O_3$ after about 255 FCT cycles at about 1163° C. (2125° F.). A second FCT ("second run") was conducted with about 47.1 wt. % $Yb_2O_3$ and about 0.59 wt. % $Y_2O_3$ after about 215 FCT cycles at about 1163° C. (2125° F.).

Figure 5:
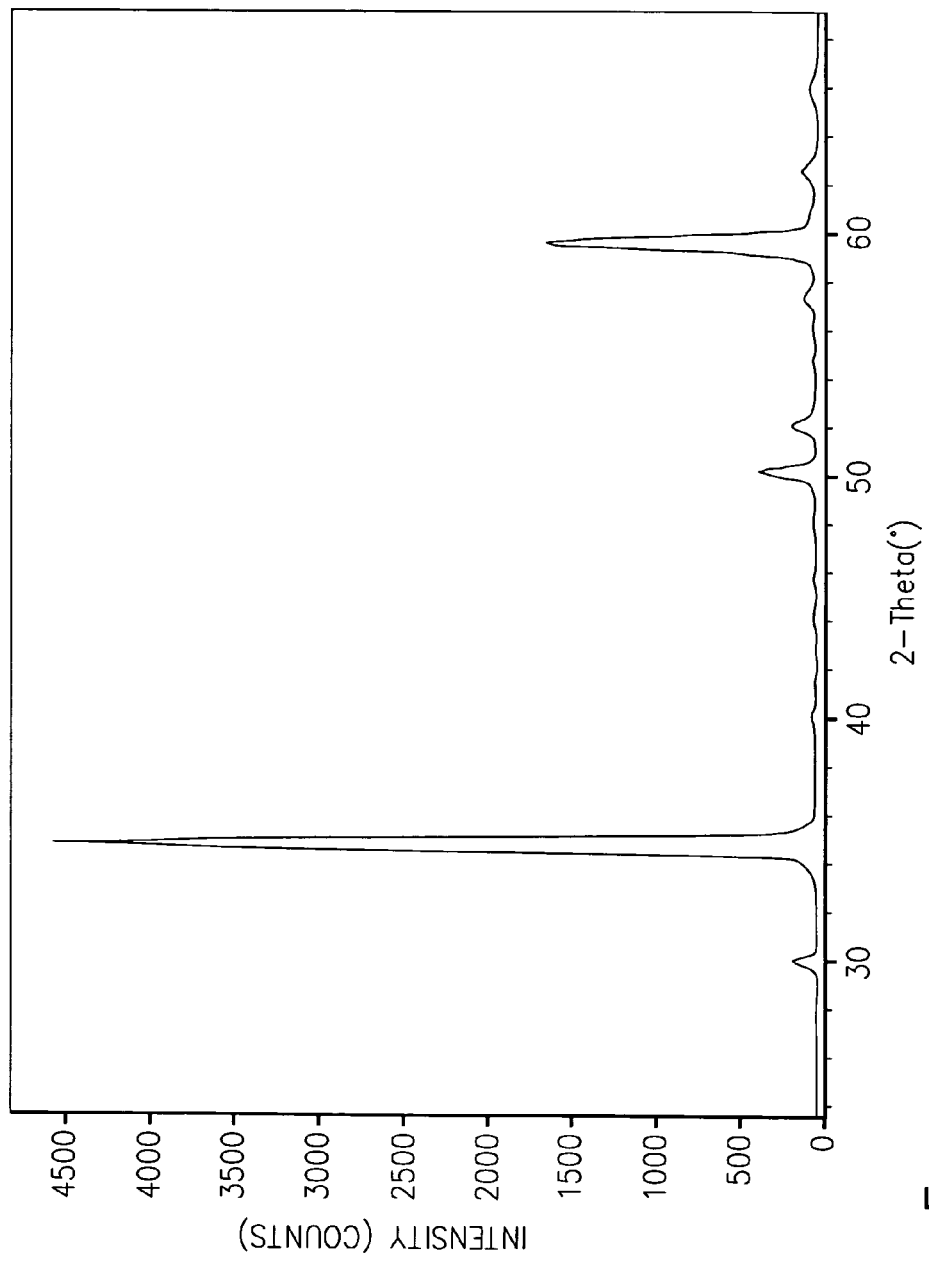
FIGS. 5-6 illustrate x-ray diffraction patterns of $Yb_4Zr_3O_{12}$ TBCs conducted after FCT performance tests.
Figure 6:
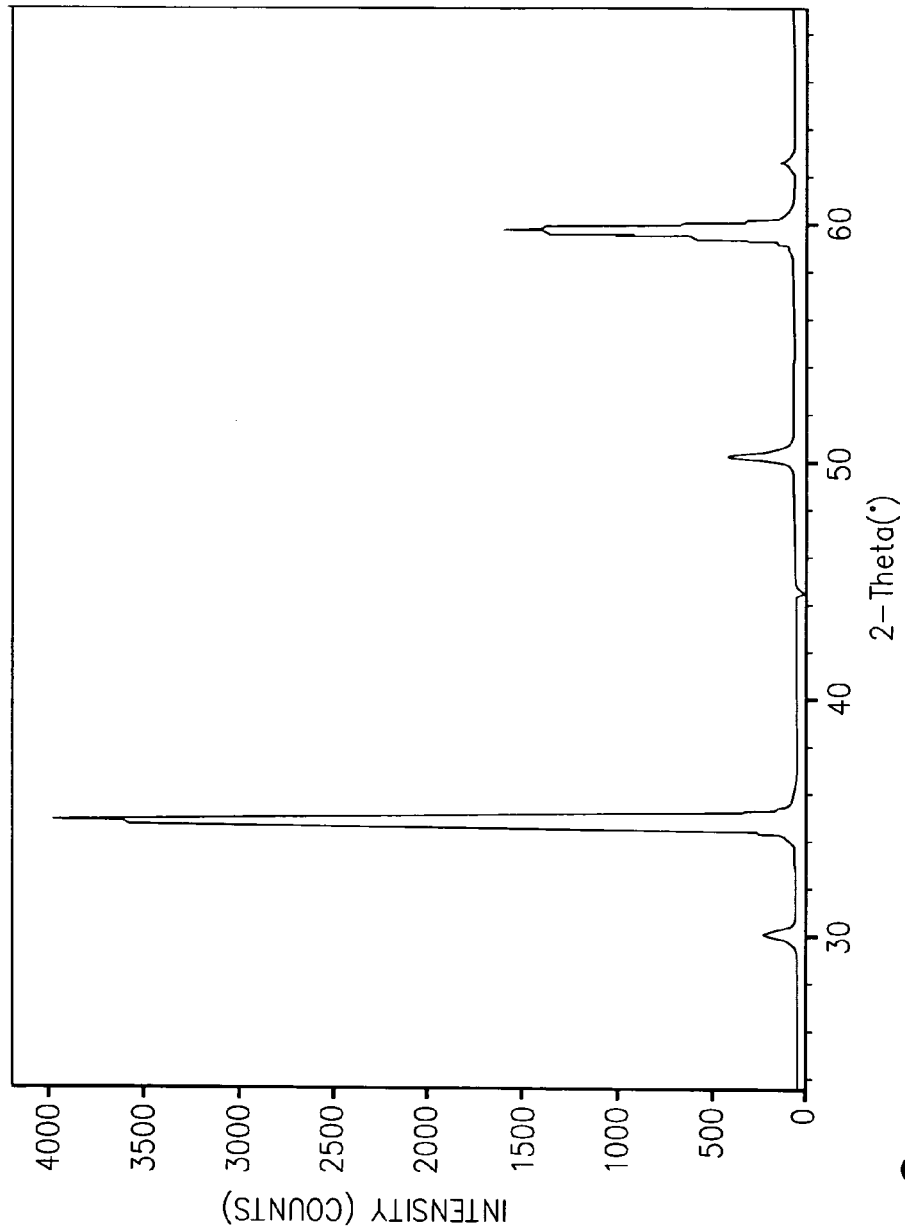

Next, after performing each of these runs, the samples, i.e. the $Yb_4Zr_3O_{12}$ compounds having the rhombohedral crystalline structures with a hexagonal setting, were then evaluated with x-ray diffraction analysis to test the phase stability of the crystalline structure after being subjected to the rigorous FCT tests. FIG. 5 depicts the x-ray diffraction patterns of the $Yb_4Zr_3O_{12}$ compound of the first run after the first run FCT tests were conducted. FIG. 6 depicts the x-ray diffraction patterns of the the $Yb_4Zr_3O_{12}$ compound of the second run after the FCT tests were conducted.

FIGS. 5 and 6 advantageously illustrate, via the x-ray diffraction patterns, that the $Yb_4Zr_3O_{12}$ compounds still maintained their rhombohedral crystalline structure with hexagonal setting even after the rigorous FCT testing. These results thus indicate that the rhombohedral crystalline structure of the $Yb_4Zr_3O_{12}$ TBC 18 compound has very good phase stability characteristics. It is also noted that the x-ray diffraction results illustrated in FIGS. 5 and 6 were verified using an analysis database named Power Diffraction File 2 (PDF2). This PDF2 database is provided by the organization known as The International Center For Diffraction Data (I-CDD).

Taken as a whole, the above tests illustrated in Table 1 and FIGS. 3-6 show that the TBC 18 of the invention is a multi-beneficial TBC In particular, the TBC 18 exhibited very low thermal conductivity, and resistance to erosion, impact and spallation. The TBC 18 also exhibited very good phase stability, as well. Often, in the prior art, a TBC will provide a beneficial effect, such as lower thermal conductivity, but fail to provide other important properties, such as resistance to hostile environmental conditions e.g. erosion, impact, spallation or provide phase stability. It is preferable to have a TBC 18, which accomplishes many different purposes so that several additional layers do not have to be added to the TBC system causing an increase in thickness. As note above, thicker TBC coating systems may be disadvantageous because these systems can increase processing and material costs.

It is further noted that the above examples and test conditions represented in Table 1 and FIGS. 3-6 are by way of example and in no way meant to limit the scope of the invention.

Additionally, as described above in accordance with embodiments of the invention, the TBC 18, for example $Yb_4Zr_3O_{12}$, exists in a rhombohedral phase. While not wishing to be bound by any theory described herein, it is theorized that this rhombohedral phase, e.g. rhombohedral crystalline structure with a hexagonal setting, may be responsible for some or all the beneficial properties exhibited by, for instance, the $Yb_4Zr_3O_{12}$ TBC 18. Some possible reasons why the rhombohedral phase of the TBC 18 may be responsible fully or at least in part for the beneficial properties of the TBC in embodiments of the invention is that the complex structure of a rhombohedral phase contributes to increasing phonon scattering and thus lowers the thermal conductivity of $Yb_4Zr_3O_{12}$. Another possible reason why the rhombohedral phase of $Yb_4$—$Zr_3O_{12}$ may contribute to the beneficial properties of the TBC 18 mentioned above, is that the rhombohedral phase causes a decrease in the sintering response of the TBC 18 compound, which results in a lower thermal conductivity. The rhombohedral phase of the $Yb_4Zr_3O_{12}$ reduces the sintering response of TBC 18 because for sintering to occur, the ions of the compound must be able to diffuse through the system. However, when ions are tightly bound as they are in the rhombohedral phase, diffusion becomes more difficult and the sintering response of the TBC 18 should also decrease. Yet another possible reason why the rhombohedral phase may be responsible for all or part of the beneficial properties exhibited by the TBC 18 is that the rhombohedral phase has different mechanical properties than, for example, a cubic or pyrochlore TBC. It is theorized that because the rhombohedral phase has different mechanical properties it will also behave differently in erosion and/or impact testing than for example a cubic or pyrochlore TBC This is believed to be particularly supported by the FIG. 3 results above, wherein rhombohedral phase (e.g. in FIG. 3, a rhombohedral crystalline structure with hexagonal setting) $Yb_4Zr_3O_{12}$ TBC 18 outperformed cubic $Nd_2O_3$—$ZrO_2$ in both erosion and impact testing.

It is known from experimentation, including the experimental data illustrated above that when, for example, from about 35% to about 75% by weight of $Yb_2O_3$ is combined with $ZrO_2$ to form the $Yb_4Zr_3O_{12}$ TBC 18, the TBC 18 displays the beneficial properties hereinabove described. Further, experimentally it was determined that the rhombohedral phase (including the rhombohedral crystalline structure with hexagonal setting) of $Yb_4Zr_3O_{12}$ first resulted, beginning when at least about 40% by weight of $Yb_2O_3$ was combined with $ZrO_2$ to form the $Yb_4Zr_3O_{12}$ TBC 18 and this rhombohedral phase was also formed through the range of about 35% to about 75% by weight of $Yb_2O_3$ combined with $ZrO_2$ to form the $Yb_4Zr_3O_{12}$ TBC 18. In addition, it is also believed that the beneficial properties, as well as the rhombohedral phase also extends beyond the 75 % by weight $Yb_2O_3$ concentration amount. Further as mentioned earlier, the $Yb_2O_3$ and other rare earth oxides may alternatively be combined with Hafnia ($HfO_2$) instead of $ZrO_2$ to form the TBC 18 having the same rhombohedral phase with the same beneficial properties as that of the zirconia/rare earth oxide combination.

TBC 18, in accordance with embodiments of the invention, may be deposited by EBPVD, air plasma spraying (APS), High Velocity Oxygen Fuel (HVOF), Detonation Gun (D-Gun) or any other suitable deposition process. A preferred process is EBPVD, which entails loading a component (such as the substrate 12) to be coated into a coating chamber, evacuating the chamber, and then optionally backfilling the chamber with oxygen and an inert gas such as argon to achieve a subatmospheric chamber pressure. The component is then supported in proximity to one or more ingots of the desired coating materials, and one or more electron beams are projected onto the ingot(s) so as to evaporate the ingots and produce a vapor that deposits (condenses) on the component surface.

Alternatively, the thermal barrier compositions could be deposited as a noncolumnar TBC using a plasma spraying technique, such as APS. Plasma spraying TBCs in accordance with embodiments of the invention can be performed by melting, e.g. $Yb_4Zr_3O_{12}$ powder with a plasma generated by a plasma spray gun. The molten powder particles impact the surface of the component, yielding grains in the form of "splats," as known in the art.

While various embodiments are described herein, it will be appreciated from the specification that various combinations of elements, variations and improvements therein may be made by those skilled in the art, and are within the scope of the invention.

What is claimed is:

1. A thermal barrier coating for inclusion in a thermal barrier coating system, the coating consisting of: a compound consisting of an intended rhombohedral phase, wherein said compound has the formula of: $A_4B_3O_{12}$, and wherein A is at least one rare earth element; and B is Hf, Zr or a mixture thereof.

2. The thermal barrier coating of claim 1, wherein the rare earth element of A is selected from the group consisting of: Yb, Ho, Er, Tm, Lu, and mixtures thereof.

3. The thermal baffler coating of claim 2, wherein the at least one rare earth element A is Yb.

4. The thermal barrier coating of claim 2, wherein the at least one rare earth element selected from A is included as at least one rare earth oxide in forming the TBC compound, said at least one rare earth oxide is included in an amount from about 35% by weight to about 75% by weight.

5. The thermal baffler coating of claim 1, wherein B is Hf.

6. The thermal barrier coating of claim 5, wherein the thermal barrier coating compound formed is $Yb_4Hf_3O_{12}$.

7. The thermal baffler coating of claim 1, wherein B is a mixture of Zr and Hf.

8. The thermal barrier coating of claim 1, wherein the compound of the thermal barrier coating consists of an intended rhombohedral crystalline structure with a hexagonal setting.

9. The thermal barrier coating of claim 1, wherein the compound of the thermal barrier coating has a structure with a space group of R-3 and space group number of 148, and the coating is located on a gas turbine engine component.

10. The thermal barrier coating of claim 1, wherein thickness of the thermal barrier coating is from about 76.2 microns to about 2540 microns.

11. The thermal barrier coating of claim 10, wherein thickness of the thermal barrier coating is about 127 microns.

12. A thermal barrier coating for inclusion in a thermal barrier coating system, the coating consisting of: a compound consisting of an intended rhombohedral phase, wherein said compound has the formula of: $A_4B_3O_{12}$, and wherein A is at least one rare earth element; and B is selected from the group consisting of Zr, Hf and mixtures thereof, wherein the rare earth element of A is selected from the group consisting of Yb, Ho, Er, Tm, Lu, and mixtures thereof; the thermal barrier coating system further comprising additional rare earth oxides selected from the group consisting of lanthana ($La_2O_3$), yttria ($Y_2O_3$), ceria ($CeO_2$), neodymia ($Nd_2O_3$), gadolinium oxide ($Gd_2O_3$) and dysprosia ($Dy_2O_3$), and any mixtures thereof.

13. A thermal barrier coating system comprising:
a bond coat that overlies a surface of a substrate;
a thermal baffler coating (TBC) bonded to the bond coat, the thermal barrier coating consisting of a compound consisting of an intended rhombohedral phase, wherein said compound has the formula of: $A_4B_3O_{12}$, and wherein A is at least one rare earth element; and B is Hf, Zr or a mixture thereof.

14. The thermal barrier coating system of claim 13, further comprising an underlayer of 7% by weight yttria stabilized zirconia, the yttria stabilized zirconia being located between the thermal barrier coating and the bond coat.

15. The thermal barrier coating system of claim 13, wherein the bond coat comprises aluminum or an aluminide.

16. The thermal barrier coating system of claim 13 comprising an aluminum oxide layer, which is grown by oxidation of the bond coat.

17. The thermal barrier coating system of claim 13, wherein the compound of the thermal barrier coating consists of an intended rhombohedral crystalline structure with a hexagonal setting.

18. The thermal barrier coating of claim 13, wherein the compound of the thermal barrier coating has a structure with a space group of R-3 and space group number of 148, and the coating is located on a gas turbine engine component.

19. The thermal barrier coating system of claim 13, wherein the at least one rare earth element selected from A is Yb, said Yb is included as a rare earth oxide comprised of $Yb_2O_3$ in forming the TBC compound, said $Yb_2O_3$ is included in an amount from about 35% by weight to about 75% by weight.

20. A thermal barrier coating for inclusion in a thermal barrier coating system, the coating consisting of: $Yb_4Hf_3O_{12}$, and wherein $Yb_2O_3$ is included in an amount from about 35% by weight to about 75% by weight to form the thermal barrier coating, wherein said $Yb_4Hf_3O_{12}$ compound consists of an intended rhombohedral crystalline structure with a hexagonal setting.

21. The thermal barrier coating of claim 20, wherein said $Yb_4Hf_3O_{12}$ compound has a structure with a space group of R-3 and space group number of 148, and the coating is located on a gas turbine engine component.

* * * * *

UNITED STATES PATENT AND TRADEMARK OFFICE
CERTIFICATE OF CORRECTION

| | | |
|---|---|---|
| PATENT NO. | : 7,476,453 B2 | Page 1 of 1 |
| APPLICATION NO. | : 11/006367 | |
| DATED | : January 13, 2009 | |
| INVENTOR(S) | : Boutwell et al. | |

It is certified that error appears in the above-identified patent and that said Letters Patent is hereby corrected as shown below:

In The Claims:

Claim 13, column 10, line 10, delete "baffler" and replace with --barrier--.

Signed and Sealed this

Seventeenth Day of March, 2009

JOHN DOLL
*Acting Director of the United States Patent and Trademark Office*